United States Patent [19]

Minami

[11] Patent Number: 4,801,197
[45] Date of Patent: Jan. 31, 1989

[54] ADAPTOR FOR MICROSCOPES PROVIDING AN ODD NUMBER OF REFLECTIONS FOR PROVIDING AN EVEN NUMBER OF REFLECTIONS IN CONJUNCTION WITH ADDITIONAL MICROSCOPE REFLECTION MEANS

[75] Inventor: Kazuyuki Minami, Musashino, Japan

[73] Assignee: Olympus Optical Co., Ltd., Tokyo, Japan

[21] Appl. No.: 154,201

[22] Filed: Feb. 11, 1988

[30] Foreign Application Priority Data

Feb. 16, 1987 [JP] Japan .................................. 62-32971

[51] Int. Cl.[4] .............................................. G02B 5/08
[52] U.S. Cl. .................................... 350/622; 350/486; 350/574; 350/603; 350/637
[58] Field of Search ................ 350/502, 511, 513–516, 350/539, 622, 637, 574, 486, 603

[56] References Cited

U.S. PATENT DOCUMENTS

| | | | |
|---|---|---|---|
| 4,143,938 | 3/1979 | Feinbloom | 350/502 |
| 4,283,110 | 8/1981 | Yonekubo | 350/511 |
| 4,652,103 | 3/1987 | Klabes | 350/502 |
| 4,688,907 | 8/1987 | Kleinberg | 350/502 |

FOREIGN PATENT DOCUMENTS

| | | | |
|---|---|---|---|
| 58-144809 | 8/1983 | Japan . | |
| 1392446 | 4/1975 | United Kingdom | 350/502 |
| 2172409 | 9/1976 | United Kingdom | 350/507 |

OTHER PUBLICATIONS

V. Beensen et al., "Chromosome Analysis . . . ", *Jena Review*, vol. 21, No. 5, pp. 242–250 (1976).

*Primary Examiner*—Jon W. Henry
*Attorney, Agent, or Firm*—Cushman, Darby & Cushman

[57] ABSTRACT

An adaptor for microscopes provided with a first reflecting device reflecting incident light an even number of times to emit the light in a direction making a predetermined angle with the incident light and a second reflecting device capable of rotating around a shaft positioned near a center of gravity so as to be made to rest on two predetermined positions and reflecting once the incident light coming from the first reflecting device to emit the light in either direction of the mount for the TV camera or the mount for the still camera, in order to minimize vibration generated in rapid switchover between the TV camera mode and the still camera mode, bring about an image exhibiting the right side in any use of the TV camera and the still camera, and make it possible to be designed for a small size. The first reflecting device comprises a prism having a pair of opposite reflecting surfaces or a pair of mirrors in which reflecting surfaces are opposite to each other, while said second reflecting device includes a single mirror or a double mirror.

7 Claims, 4 Drawing Sheets

OBSERVING
LIGHT

OPERATOR

ADAPTOR FOR MICROSCOPES PROVIDING AN ODD NUMBER OF REFLECTIONS FOR PROVIDING AN EVEN NUMBER OF REFLECTIONS IN CONJUNCTION WITH ADDITIONAL MICROSCOPE REFLECTION MEANS

BACKGROUND OF THE INVENTION (a) Field of the Invention:

The present invention relates to a microscope apparatus, and more particularly to an adaptor for microscopes.

(b) Description of the Prior Art:

Recently, with the development and propagation of a microsurgery technique, surgical microscopes have come into use in a variety of medical fields. In a surgical operation generally performed under the microscope, an assistant as well as an operator assumes his important duties and it is necessary for the assistant to observe the same part to be operated as that the operator observes through the microscope. Further, for the purpose of education or recording serious examples of affected parts, it becomes necessary to take a photograph of the part to be operated, with an image magnified through the microscope by the use of a video or still camera. Therefore, some of surgical microscopes (stereo-microscopes) are provided with a beam splitter in each of two observing optical paths so that an observing device for the assistant and TV and still photographing devices can be provided on each of splitted optical paths. Particularly, it is desirable that the photographing devices have simultaneously both a TV camera for recording an operative technique and a still camera for clearly recording the examples of affected parts. In order to fill such requirements, some adaptors for microscopes have been proposed. The first example of the above prior art is set forth in U.S. Pat. No. 4,143,938, and by way of this explanation, referring to FIG. 1, reference numeral 1 represents a surgical microscope body provided with an objective lens 2, variable power lenses 3, 3' and beam splitters 4, 4' therein. According to this lens configuration, observing light which has transmitted the beam splitters 4, 4' is incident on an observing system 5 for an operator to be formed as an image so that the operator can observe the image. Also, on an optical path splitted by the beam splitter 4, an observing system 6 for an assistant can be provided and, since a beam of light splitted by the beam splitter 4 is formed as an image through the observing system 6 for the assistant, the lens configuration is made so that the assistant can observe the same image as that the operator observes. On the other hand, an adaptor 7 is provided on an optical path splitted by the beam splitter 4' so that it can be mounted to and demounted from the microscope body. Further, on the optical path in the adaptor 7, an image forming lens 8 and a movable mirror 9 rotating around a rotary shaft A are provided, and relay lenses 10, 10' are disposed on an optical path of light reflected by the movable mirror 9 and on an optical path of light traveling straight without reflection in the case where the movable mirror 9 is in the position indicated by the dotted line, respectively, so that a TV camera 11 and a still camera 12 can be mounted in the rear of the relay lenses 10, 10', respectively. Thus, in the case of TV photographing, the observing light splitted by the beam splitter 4' is, after traversing the image forming lens 8, reflected from the movable mirror 9, is relayed through the relay lens 10, and then is formed as an image on the image pickup surface of the TV camera 11. By this procedure, the TV photographing is performed. On the other hand, in the case of the photograhing with the still camera 12, for example, a 35 mm camera, the movable mirror 9 is sprung upward to be fixed in the position indicated by the dotted line. As a result, the observing light splitted by the beam splitter 4' travels straight also after traversing the image forming lens 8, as it is, is relayed through the relay lens 10' and is formed as an image on the film surface of the 35 mm camera. In such a manner, the photographing with the 35 mm camera is carried out.

The second example of the prior art is shown in Japanese Patent Preliminary Publication No. Sho 58-144809, and by way of this explanation, referring to FIG. 2, reference numeral 13 represents an adaptor in which the image forming lens 8 and a movable mirror 14 rotating around a rotary shaft B are provided and a relay lens 10 is further provided on an optical axis of light deflected by the movable mirror 14 so that the TV camera can be mounted on the adaptor in the rear of the relay lens 10. Also, in a direction, passing through the intersection of the optical axis of the observing light with the reflecting surface of the movable mirror 14, normal to the optical axis of the observing light and the optical axis of the light incident on the TV camera 11, a relay lens not shown is disposed so that the still camera 12 or 12' can be attached to the adaptor in the rear of the relay lens as shown in FIG. 3. In the TV photographing, therefore, the observing light splitted by the beam splitter 4' (refer to FIG. 1) is, after the traverse of the image forming lens 8 as shown in FIG. 2, reflected from the movable mirror 14 and is relayed through the relay lens 10 to be informed as an image on the image pickup surface of the TV camera 11. On the other hand, in photographing with the still camera, the movable mirror 14 is previously rotated counterclockwise (or clockwise) by 90°, from the position shown in FIG. 2, around the rotary shaft B. Thereby, after passing through the image forming lens 8, the observing light is reflected from the movable mirror 14, is relayed by the relay lens not shown, and then is image-formed on the film surface of the still camera 12 (or 12'). Also the adaptor 13, like the first example of the prior art, is equipped with fittings not shown so that it can be attached to and detached from the surgical microscope body 1.

The first example of the prior art, however, has encountered problems that, since the light directed to the still camera 12 is reflected for once through the beam splitter 4' as depicted in FIG. 1, the image formed on the film surface of the still camera 12 exhibits the reverse side as compared with that formed when an object to be observed is viewed from its front, with the result that it is always necessary to turn over the negative of the image for printing in photographic processing, which makes the work difficult and, if incorrect printing is made, erroneous diagnosis may be caused. Also, when the switchover between the optical path for the TV camera and the optical path for the still camera is manually performed, it takes much time to switch the optical path from the TV camera photographing mode to the still camera photographing mode and further to the TV camera photographing mode and, during this switchover, a surgicaal operation is inevitably interrupted, so that it is desirable that the movable mirror 9 is operated automatically. However, if an attempt is made to spring suddenly the mirror upward as in ordinary single reflex camera, the movement of the movable mirror 9 causes considerable vibration due to some distance between the center of gravity and the center of rotation of the movable mirror 9 and consequently, in the surgical operation under the observation made by the microscope in particular, the part to be operated vibrates within the visual field into a serious danger. For this reason, the operation is performed at present in such a manner that the driving speed of a motor is reduced by a gear governor to move slowly the movable mirror 9. However, since the switching time is enlarged after all, the effect of reducing the interrupted time of the operation during the switchover has been not virtually brought about.

Also, the second example of the prior art does not cause such a defect that the image formed on the film surface of the still camera 12 exhibits the reverse side as in the first example of the prior art. In the second example, however, there has been a problem that, as shown in FIG. 4, when a chief operator and a sub-operator are opposite to each other as in plastic and orthopedic surgery operations to perform an operation, it is inevitable that the still camera 12 (12') projects into either side of the two operators and the behavior of the operators toward the operation is limited, with the result that safety for the performance of the operation is endangered. It is, therefore, favorable that the mounting position of the still camera is on the opposite side of the mounting portion to the microscope body 1 with respect to the adaptor as in the first example of the prior art. Further, a difficulty has been encountered that, although the use of an image rotator known as prior art allows the image formed on the film surface of the still camera to be inverted into the right side or the reverse side, accommodation of the image rotator onto the side of the still camera produces inevitably a large-sized microscope and, as a result, the operability of the microscope is considerably reduced.

SUMMARY OF THE INVENTION

In view of the above problems, the primary object of the present invention is to provide an adaptor for microscopes which is small in size, brings about an image exhibiting the right side in any use of a TV camera and a still camera and minimizes the generation of vibration even if optical paths for the TV camera and the still camera are rapidly switched over to each other.

According to the present invention, the adaptor for microscopes, which is equipped with a mount for the microscope, a mount for the TV camera and a mount for the still camera and is designed so that light reflected an odd number of times in a miroscope body is incident thereon, is provided with a first reflecting device reflecting the incident light an even number of times to emit the light in a direction making a predetermined angle with the incident light and a second reflecting device constructed so as to be able to rotate around a shaft positioned adjacent to the center of gravity and to rest on two predetermined positions and reflecting for once the incident light coming from the first reflecting device to emit the light in either direction of the mount for the TV camera or the mount for the still camera. Thereby, after emerging from the microscope body, photographing light incident on the TV camera or the still camera can be reflected an odd number of times in the adaptor and the balance of the rotation of the second reflecting device can be held due to the rotating center located close to the center of gravity thereof. Accordingly, together with the fact that an operating space for the operators can fully be secured during the operation, the interrupted time of the operation in photographing can be reduced and the vibration of the microscope which may be generated at that time is completely controlled, so that safety performance of the operation is assured and records significant for diagnosis in the future are correctly kept with resultant great contribution to the development of a medical field.

This and other objects as well as the features and advantages of the present invention will be apparent from the following detailed description of the preferred embodiments when taken in conjunction with the accompanying drawings.

DESCRIPTION OF THE PREFERRED EMBODIMENTS

Figure 1:
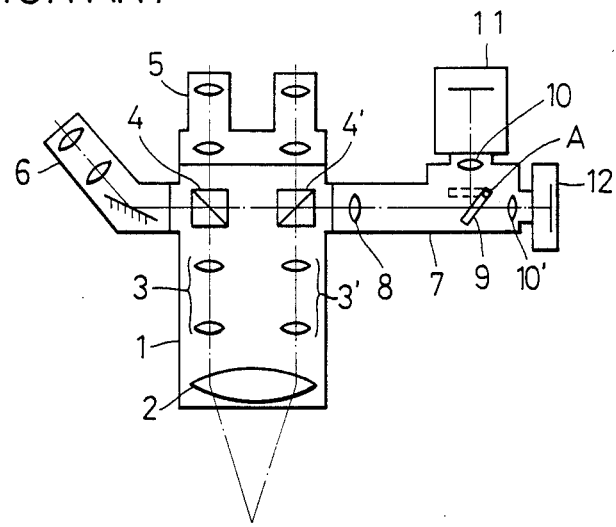
FIG. 1 is a view showing a basic structure of an microscope apparatus mounting an example of conventional adaptors of microscopes.
Figure 2:
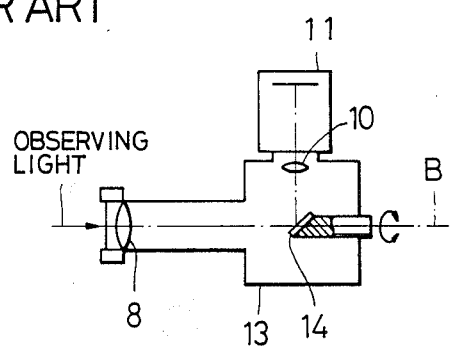
FIG. 2 and 3 are a schematic structural view and a perspective view showing another example of the conventional adaptors of microscopes, respectively.
Figure 3:
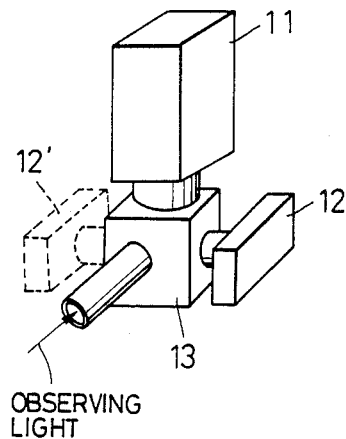
Figure 4:
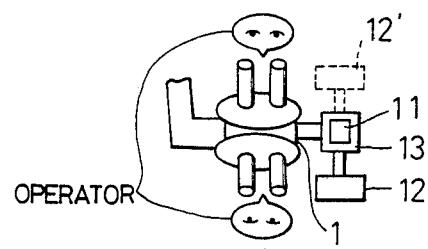
FIG. 4 is a perspective view showing a working condition of the adaptor, shown in FIG. 2, in an operation.
Figure 5:
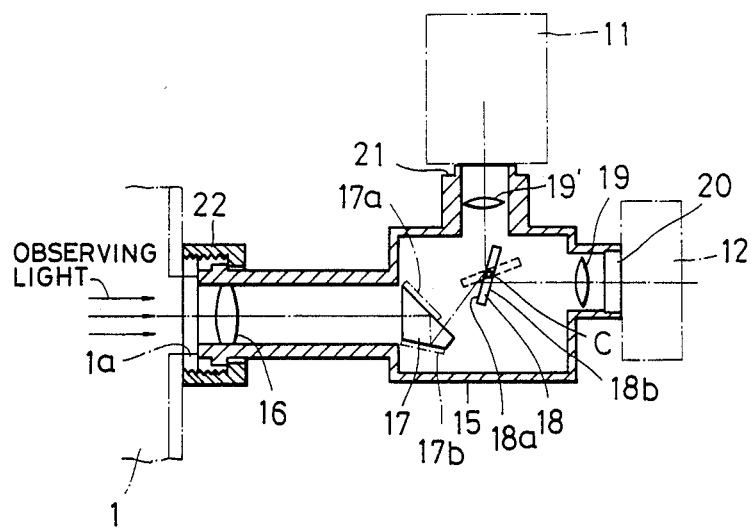
FIG. 5 is a sectional view of one embodiment of the adaptor for microscopes according to the present invention.

FIG. 5 shows a first embodiment and an adaptor body 15 includes an image forming lens 16; a prism 17 reflecting incident light twice to emit the light in a direction making an angle of 135° with an optical axis of incidence; a movable double mirror 18 having a rotary shaft C positioned adjacent to the center of gravity and capable of rotating around the rotary shaft C so as to be selectively located in either of two positions; and relay lenses 19, 19' located on optical axes deflected through the movable double mirror 18 in accordance with the two positions, behind which a mount 20 for the still camera 12 and a mount 21 for the TV camera 11 are provided, respectively. Further, at an entrance end of the adaptor on which the observing light coming from the microscope body 1 is incident, a mount 22 for the microscope comprising a threaded mount and the like is fitted to enable the adaptor to be connected with the microscope body 1 optically and mechanically.

Next, the function of the preceding embodiment will be described below.

The adaptor body 15 is coupled, in use, with a mount 1a of the microscope body 1 which is provided at the position through which the splitted observing light is emitted, by means of the mount 22 for the microscope. Further, the still camera 12 such as a 35 mm camera or a Polaroid camera is attached to the mount 20 for the still camera, while the TV camera 11 to the mount 21 for the TV camera. In an ordinary operation, photographing is performed through the TV camera 11 in order that an assistant or a nurse inspects how far the operation has progressed or to record the technique of the operation and, in such an instance, the movable double mirror 18 is located in a solid line position shown in FIG. 5. Hence, the observing light coming from the microscope body 1, after transmitting the image forming lens 16, is reflected twice from the prism 17, is further reflected from a reflecting surface 18a of the movable double mirror 18, then traverses the relay lens 19', and is incident on the TV camera 11 for image formation, thereby performing the TV photographing. Also, when records for surgical examples required photographing with the still camera 12, a manual operating mechanism such as a manual knob, not shown interlocking with the movable double mirror 18 or an electrical driving device such as a solenoid not shown causes the movable double mirror 18 to be switched over to a dotted line position. As a result, the observing light, after transmitting the image forming lens 16, is reflected twice from the prism 17, is further reflected from a reflecting surface 18b of the movable double mirror 18, then traverses the relay lens 19, and is incident on the still camera 12 for image formation, thus performing the photographing with the still camera.

In the first embodiment which has been described with respect to its function, the photographing light incident on the TV camera 11 or the still camera 12 after emerging from the microscope body 1 is reflected for once from the movable double mirror 18 in the adaptor 15, so that the total number of reflection of the photographing light given in an even number, together with the number of reflection for once in the microscope body and consequently the image exhibiting the right side is attained in both the TV camera and the still camera. In addition, since the image rotator is not employed in this case, the entire adaptor can be reduced in size. Also, the rotation of the movable double mirror 18 is balanced due to the rotating center located near the center of gravity of the adaptor, with the result that the generation of vibration is minimized even if the TV camera photographing mode and the still camera photographing mode are rapidly switched over to each other. Futhermore, by using the double mirror 18 as the movable mirror, this embodiment can form the rotating angle of the mirror into 45° which is extremely small as compared with the case (an angle of 135°) of a single mirror and as such it brings about a more significant effect on the control of vibration.

Figure 6:
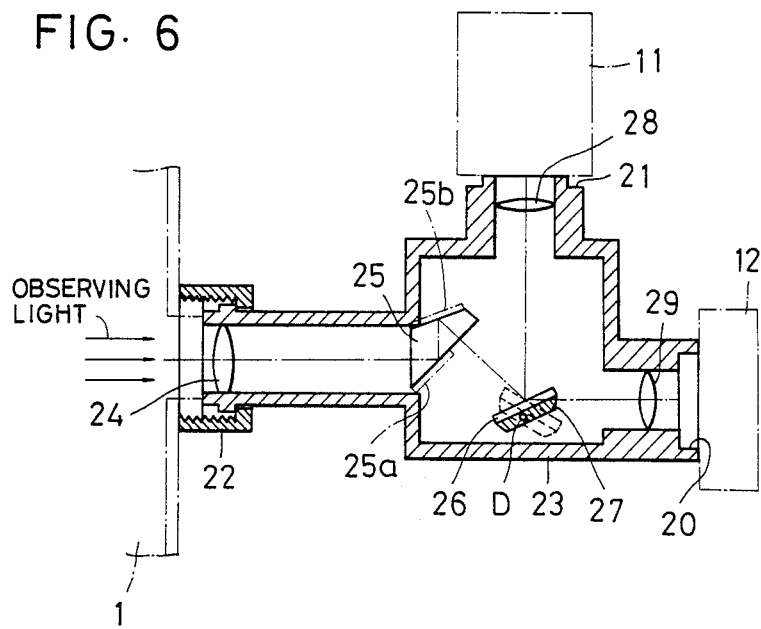
FIG. 6 is a sectional view of another embodiment of the adaptor for microscopes according to the present invention.
Figure 7:
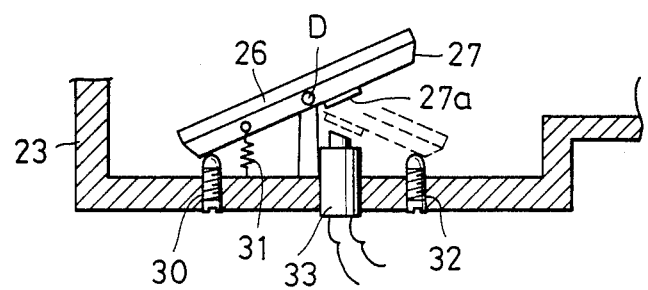
FIG. 7 is a partially enlarged view showing an example of an electromagnetic driving device for a movable mirror in the embodiment shown in FIG. 6.

FIG. 6 shows a second embodiment and an adaptor body 23 is formed with a first image forming lens 24; a prism 25 reflecting the incident light twice to emit the light in a direction making an angle of 135° with the optical axis of incidence; and a movable mirror seat 27 securing tightly a mirror 26 and having a rotary shaft D adjacent to the center of gravity composite with the mirror 26 so as to be selectively located in either of two positions. Further, on individual extension lines of optical axes deflected by the mirror 26 in accordance with the two positions of the movable mirror seat 27 are provided a second image forming lens 28 and the mount 21 for the TV camera 11 or a second image forming lens 29 and the mount 20 for the still camera 12. These mounts 20, 21, 22 have the same structures as in the first embodiment. FIG. 7 shows an example of an electromagnetic driving device for the movable mirror 26 in the second embodiment mentioned above. Here, reference numeral 31 represents a stopper screw threadmounted adjustably to a side wall of the adaptor body 23 and for causing the movable mirror 26 or the movable mirror seat 27 to rest in a solid line position shown in FIG. 6, 31 a spring for biasing the movable mirror seat 27 counterclockwise, 32 a stopper screw threadmounted adjustably to the side wall of the adaptro body 23 and for causing the movable mirror 26, or the movable mirror seat 27 to rest in a dotted line position shown in FIG. 6, and 33 an electromagnet attached to the side wall of the adaptor body 23 so that a magnetic pole faces an iron piece 27a fixed onto the back surface of the movable mirror seat 27.

Next, the function of the second embodiment will be described hereinafter.

In photographing with the TV camera, the observing light coming from the microscope body 1 is once image-formed in the vicinity of the prism 25 through the first image forming lens 24. Then, the observing light is reflected twice from the prism 25 before deflected by the mirror 26 set at the solid line position and is formed as an image on the image pickup surface of the TV camera 11 through the second image forming lens 28. On the other hand, in photographing with the still camera, the position of the mirror 26 and the movable mirror seat 27 is shifted to the dotted line position by means of the manual operating device not shown or the electromagnetic driving device shown in FIG. 7, interlocking with the movable mirror seat 27. Thus, the observing light after once image-formed near the prism 25 is reflected twice from the prism 25, is deflected by the mirror 26, and is formed as an image on the film surface of the still camera through the second image forming lens 29. Now, the function of the electromagnetic driving device shown in FIG. 7 will be explained. In a normal state, the movable mirror 26 is held in a solid line position, that is, a position capable of photographing with the TV camera by virture of the stopper screw 30 and the spring 31. However, when a foot switch or the like not shown in operated and thereby the electromagnet 33 is energized, the movable mirror 26 is turned clockwise to a position where the iron piece 27a is attracted by the electromagnet 33 and the movable mirror seat 27 abuts against the stopper screw 32, that is, a dotted line position, so that the movable mirror 26 is brought to the mode capable of photographing with the still camera. In such a state, if the foot switch or the like is operated again to deenergized the electromagnet 33, the movable mirror 26 is returned automatically to the solid line position by virtue of the spring 31. As will be obvious from the preceding explanation, the surgical operator can carry out the changeover between the TV camera mode and the still camera mode while operating.

In the embodiment, therefore, the arrangement is such that the image is once formed in the adaptor 23, and consequently a front image is attained on the image pickup surface of the TV camera 11 and on the film surface of the still camera 12. Futhermore, since the configuration os the prism 25 is changed in comparison with the first embodiment, the same effect as in the first embodiment is brought about even though the double mirror is not used, with resultant reduction of manufacturing costs.

Although, in the first and second embodiments, the prisms 17, 25 emitting the light in the direction making an angle of 135° with the optical axes of incidence have been employed, it is known that this angle of exit is arbitrarily selected as necessary, and mirrors 17a, 17b; 25a, 25b may be used in combination, instead of these prisms, as indicated by chain lines in FIGS. 5 and 6.

Further, the rotating movement the mirror 18 in the first embodiment can also be controlled by use of such an electromagnetic driving device as shown in FIG. 7.

What is claimed is:

1. In an adaptor for microscopes provided with a mount for a microscope, a mount for a TV camera and a mount for a still camera and adapted to introduce therein light reflected an odd number of times in a microscope body, an improvement comprising:

first reflecting means reflecting incident light an even number of times to emit the light in a direction making a predetermined angle with the incident light; and second reflecting means being able to rotate around a shaft positioned near a center of gravity thereof so as to be made to rest on two predetermined positions and reflecting once the incident light coming from said first reflecting means to emit the light in one direction of the mount for the TV camera and the mount for the still camera.

2. An adaptor for microscopes according to claim 1, wherein said second reflecting means is constructed as a double mirror.

3. An adaptor for microscopes according to claim 1, wherein said first reflecting means is a prism including a pair of opposite reflecting surfaces for reflecting the incident light twice to emit the light in a direction making an angle of 135° with an optical axis of incidence.

4. An adaptor for microscopes according to claim 3, wherein said second reflecting means is constructed as a double mirror.

5. An adaptor for microscopes according to claim 1, wherein said first reflecting means comprises a pair of mirrors arranged on opposite sides so as to reflected the incident light twice to emit the light in a direction making an angle of 135° with an optical axis of incidence.

6. An adaptor for microscopes according to claim 5, wherein said second reflecting means is constructed as a double mirror.

7. An adaptor for microscopes according to claim 1, further comprising an electromagnetic driving device arranged in association with said second reflecting means and being able to bring alternately said second reflecting means to said two predetermined positions.

* * * * *